United States Patent
Yamane et al.

(10) Patent No.: US 12,504,655 B2
(45) Date of Patent: Dec. 23, 2025

(54) OPTICAL WAVEGUIDE ELEMENT, AND OPTICAL MODULATION DEVICE AND OPTICAL TRANSMISSION APPARATUS THAT USE SAME

(71) Applicant: SUMITOMO OSAKA CEMENT CO., LTD., Tokyo (JP)

(72) Inventors: Yuji Yamane, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 300 days.

(21) Appl. No.: 18/021,342

(22) PCT Filed: Sep. 28, 2021

(86) PCT No.: PCT/JP2021/035550
§ 371 (c)(1),
(2) Date: Feb. 14, 2023

(87) PCT Pub. No.: WO2022/071283
PCT Pub. Date: Apr. 7, 2022

(65) Prior Publication Data
US 2023/0305325 A1  Sep. 28, 2023

(30) Foreign Application Priority Data
Sep. 30, 2020  (JP) .................. 2020-165005

(51) Int. Cl.
*G02F 1/03* (2006.01)
*G02F 1/035* (2006.01)
(Continued)

(52) U.S. Cl.
CPC ............ *G02F 1/035* (2013.01); *G02F 1/0147* (2013.01); *G02F 1/212* (2021.01); *G02F 1/225* (2013.01);
(Continued)

(58) Field of Classification Search
CPC ........ G02F 1/035; G02F 1/212; G02F 1/0147; G02F 1/225; G02F 2201/127; G02F 2202/20
See application file for complete search history.

(56) References Cited

U.S. PATENT DOCUMENTS

| | | | |
|---|---|---|---|
| 5,393,371 A * | 2/1995 | Chang ................. | H01S 3/06704 216/33 |
| 6,396,984 B1 * | 5/2002 | Cho ....................... | G02B 6/136 385/28 |

(Continued)

FOREIGN PATENT DOCUMENTS

| JP | 2000214341 A * | 8/2000 | ........... G02B 6/1228 |
|---|---|---|---|
| JP | 2006284961 A * | 10/2006 | ............. G02F 1/035 |

(Continued)

*Primary Examiner* — Peter Radkowski
(74) *Attorney, Agent, or Firm* — IpHorgan Ltd.

(57) ABSTRACT

To provide an optical waveguide device that is small, has low optical loss, and has long-term stability. Provided is an optical waveguide device in which an optical waveguide A (20) is formed on a first substrate (2), an end portion of the first substrate has an input portion that inputs a light wave into the optical waveguide A or an output portion that outputs a light wave from the optical waveguide A, an optical waveguide B (10) is formed on a second substrate (1), the second substrate has an optical modulation portion that modulates a light wave propagating through the optical waveguide B, and at least a part of the optical waveguide A (20) has a conversion portion (20) that converts an optical mode field diameter.

10 Claims, 5 Drawing Sheets

(51) Int. Cl.
  *G02F 1/01* (2006.01)
  *G02F 1/21* (2006.01)
  *G02F 1/225* (2006.01)
(52) U.S. Cl.
  CPC .... *G02F 2201/127* (2013.01); *G02F 2202/20* (2013.01)

(56) References Cited

U.S. PATENT DOCUMENTS

| | | | | |
|---|---|---|---|---|
| 6,400,490 B1* | 6/2002 | Hosoi | G02F 1/225 | 359/254 |
| 7,171,094 B2* | 1/2007 | Mizuuchi | G02F 1/3775 | 385/129 |
| 7,286,727 B2* | 10/2007 | Sugiyama | G02F 1/035 | 385/14 |
| 7,295,742 B2* | 11/2007 | Sugita | G02B 6/136 | 385/129 |
| 7,362,924 B2* | 4/2008 | Ichioka | G02F 1/0311 | 385/2 |
| 7,382,942 B2* | 6/2008 | Mitomi | G02B 6/125 | 385/9 |
| 7,502,530 B2* | 3/2009 | Kondo | G02F 1/0356 | 385/40 |
| 7,548,678 B2* | 6/2009 | Sugita | G02F 1/377 | 385/132 |
| 7,643,205 B2* | 1/2010 | Yoshino | G02F 1/3775 | 359/328 |
| 7,660,493 B2* | 2/2010 | Kondou | G02F 1/035 | 385/39 |
| 7,668,409 B2* | 2/2010 | Sugiyama | G02F 1/0356 | 385/14 |
| 7,899,279 B2* | 3/2011 | Nasu | H04B 10/676 | 385/14 |
| 7,974,501 B2* | 7/2011 | Hamajima | G02F 1/035 | 385/2 |
| 7,995,872 B2* | 8/2011 | Aoki | G02F 1/225 | 385/2 |
| 8,391,651 B2* | 3/2013 | Ichikawa | G02F 1/035 | 385/1 |
| 8,396,334 B2* | 3/2013 | Ichikawa | G02B 6/4204 | 385/1 |
| 8,406,578 B2* | 3/2013 | Oikawa | G02F 1/225 | 385/3 |
| 9,377,666 B2* | 6/2016 | Miyazaki | G02F 1/225 | |
| 9,804,348 B2* | 10/2017 | Badihi | G02B 6/4249 | |
| 10,359,653 B2* | 7/2019 | Kondou | G02F 1/0316 | |
| 10,589,255 B1 | 3/2020 | Nawaz | C01G 35/00 | |
| 10,852,492 B1* | 12/2020 | Vermeulen | G02B 6/423 | |
| 10,921,682 B1* | 2/2021 | Wang | G02F 1/225 | |
| 10,948,658 B2* | 3/2021 | Florian Lohse | G02B 6/4227 | |
| 11,409,059 B1 | 8/2022 | Vermeulen | G02B 6/4251 | |
| 11,500,264 B2* | 11/2022 | Katou | G02F 1/225 | |
| 11,624,965 B2* | 4/2023 | Makino | G02F 1/2257 | 385/2 |
| 11,656,487 B2* | 5/2023 | Kataoka | G02F 1/0353 | 385/2 |
| 11,852,953 B2* | 12/2023 | Umeki | G02F 1/3551 | |
| 12,038,614 B2* | 7/2024 | Yamada | G02B 6/403 | |
| 12,061,361 B2* | 8/2024 | Shikama | G02B 6/3616 | |
| 2003/0223722 A1* | 12/2003 | Sugita | G02F 1/377 | 385/129 |
| 2006/0109542 A1* | 5/2006 | Mizuuchi | G02F 1/3775 | 385/129 |
| 2006/0159384 A1* | 7/2006 | Sugiyama | G02F 1/0356 | 385/14 |
| 2007/0053625 A1* | 3/2007 | Ichioka | G02F 1/225 | 385/2 |
| 2007/0104407 A1* | 5/2007 | Mitomi | G02B 6/125 | 385/9 |
| 2007/0122072 A1* | 5/2007 | Kondou | G02F 1/035 | 385/2 |
| 2007/0147722 A1* | 6/2007 | Kondo | G02F 1/2255 | 385/2 |
| 2008/0037944 A1* | 2/2008 | Sugita | G02B 6/136 | 385/131 |
| 2008/0260321 A1* | 10/2008 | Sugiyama | G02F 1/035 | 385/3 |
| 2009/0116781 A1* | 5/2009 | Ichikawa | G02F 1/035 | 385/5 |
| 2009/0231680 A1* | 9/2009 | Yoshino | G02F 1/3775 | 359/328 |
| 2009/0245715 A1* | 10/2009 | Hamajima | G02B 6/4202 | 385/2 |
| 2009/0274408 A1* | 11/2009 | Aoki | G02F 1/225 | 385/2 |
| 2010/0119189 A1* | 5/2010 | Nasu | H04B 10/676 | 385/11 |
| 2010/0284644 A1* | 11/2010 | Sugamata | G02F 1/225 | 385/2 |
| 2011/0103735 A1* | 5/2011 | Oikawa | G02F 1/225 | 385/3 |
| 2011/0262071 A1* | 10/2011 | Mitomi | G02F 1/0508 | 385/2 |
| 2012/0020607 A1* | 1/2012 | Ichikawa | G02F 1/035 | 385/14 |
| 2014/0294341 A1* | 10/2014 | Hatori | G02B 6/1228 | 385/14 |
| 2015/0261060 A1* | 9/2015 | Miyazaki | G02F 1/225 | 385/3 |
| 2016/0252687 A1* | 9/2016 | Badihi | G02B 6/423 | 385/14 |
| 2016/0306120 A1* | 10/2016 | Matsumoto | G02B 6/12004 | |
| 2016/0372891 A1* | 12/2016 | Kondo | H01S 5/1014 | |
| 2018/0164612 A1* | 6/2018 | Kondou | G02F 1/2257 | |
| 2018/0246279 A1* | 8/2018 | Florian Lohse | G02B 6/1228 | |
| 2019/0162984 A1* | 5/2019 | Sugiyama | G02F 1/011 | |
| 2020/0033692 A1* | 1/2020 | Katou | G02F 1/3137 | |
| 2020/0209477 A1* | 7/2020 | Shikama | G02B 6/3636 | |
| 2021/0048721 A1* | 2/2021 | Wang | G02F 1/225 | |
| 2021/0373408 A1* | 12/2021 | Katou | G02F 1/3137 | |
| 2022/0050351 A1* | 2/2022 | Makino | G02F 1/212 | |
| 2022/0100010 A1* | 3/2022 | Kataoka | G02F 1/212 | |
| 2022/0229240 A1* | 7/2022 | Shikama | G02B 6/30 | |
| 2022/0308286 A1* | 9/2022 | Nakata | G02F 1/212 | |
| 2022/0334309 A1* | 10/2022 | Kurata | G02B 6/12014 | |
| 2022/0357526 A1* | 11/2022 | Yamada | G02B 6/403 | |
| 2022/0413355 A1* | 12/2022 | Umeki | G02B 6/1223 | |

FOREIGN PATENT DOCUMENTS

| | | | | |
|---|---|---|---|---|
| JP | 5494400 B | | 3/2014 | |
| JP | 5494400 B2 | * | 5/2014 | |
| JP | 2014191301 A | * | 10/2014 | G02B 6/12 |
| JP | 2019095698 A | * | 6/2019 | G02F 6/12 |
| WO | WO-2009106139 A1 | * | 9/2009 | G02B 6/1228 |
| WO | WO-2019180922 A1 | * | 9/2019 | |

* cited by examiner

OPTICAL WAVEGUIDE ELEMENT, AND OPTICAL MODULATION DEVICE AND OPTICAL TRANSMISSION APPARATUS THAT USE SAME

CROSS REFERENCE TO RELATED APPLICATIONS

This application is a national stage completion application of PCT Application No. PCT/JP2021/035550, filed Sep. 28, 2021, and claims priority from Japanese Patent Application No. 2020-165005, filed Sep. 30, 2020. Each of these applications is incorporated by reference herein in its entirety.

TECHNICAL FIELD

The present invention relates to an optical waveguide device, and an optical modulation device and an optical transmission apparatus that use the same.

BACKGROUND ART

Optical modulators used in next-generation optical fiber communications are required to have small size, low optical loss, and long-term stability because the optical modulators are used for multi-level modulation. In order to reduce the size of an optical modulator or the like, an optical modulator of a thin-plate structure with improved efficiency of overlap of light and electric field to reduce the drive voltage has been proposed (see Patent Literature No. 1).

As shown in FIGS. 1 and 2, the optical modulator of a thin-plate structure has a substrate 1 made of lithium niobate (LN) or the like which is thinned to a thickness of 20 µm or less, and an optical waveguide 10 is formed on the substrate 1. FIG. 1 is a plan view of an optical waveguide device constituting an optical modulator, and electrodes such as a modulation electrode are omitted for simplification. FIG. 2 is a side view of FIG. 1. The thinned substrate 1 is bonded to a holding substrate 2 via an adhesive layer 3. Lin indicates input light, and Lout indicates output light.

For use as an integrated LN optical modulator such as High Bandwidth-Coherent Driver Modulator (HB-CDM), miniaturization of the optical waveguide device is essential, and in order to reduce the drive voltage, the cross-sectional structure of the optical waveguide needs to be further miniaturized. Therefore, as shown in FIG. 3, in an optical modulator of a novel thin-plate structure, the substrate 1 made of lithium niobate (LN) or the like needs to be thinned to a thickness of 2 µm or less, and is required to be directly bonded to the holding substrate 2 without interposing an adhesive layer having a significantly different thermal expansion coefficient.

If the thickness of the substrate 1 is 2 µm or less, the optical mode field diameter of the optical waveguide 10 is about 1 µm, which is significantly different from the optical mode field diameter of the optical fiber of 10 µm. Therefore, the optical loss at the connection portion between the optical waveguide device and the optical fiber at the input portion or the output portion was about 0.5 dB at one end of the optical modulator of a thin-plate structure (thickness of about 10 µm) in the related art, but the optical modulator of a novel thin-plate structure has a significant increase of 14 dB or more at one end.

In order to reduce optical loss due to coupling with an optical fiber, in the case of optical modulators using semiconductor materials, as shown in FIG. 4 or FIG. 5, a method is proposed which converts the optical mode field diameter (MFD), by providing horizontally tapered optical waveguides (see reference numeral 11 in FIG. 4) or vertically tapered optical waveguides (see reference numeral 12 in FIG. 5) at the input portion and the output portion (see Non Patent Literature No.

However, enlarging the MFD with these horizontally or vertically tapered optical waveguides poses a serious problem that the manufacturing process is complicated. On the other hand, as shown in FIG. 6, in the case of converting the optical mode field diameter by providing an optical waveguide 13 made of an organic material at the input portion and the output portion of the thin-plate structure, the manufacturing process is relatively easy, but long-term stability such as photo-durability of organic materials becomes a problem.

CITATION LIST

Patent Literature

[Patent Literature No. 1] Japanese Patent No. 5494400

Non Patent Literature

[Non Patent Literature No. 1] Yasuyoshi Uchida et al., "Development of vertical spot size converter (SSC) capable of low connection loss using 2.5% Δ quartz-based PLC", Furukawa Electric Times, No. 125, pp. 1-5, 2010.

SUMMARY OF INVENTION

Technical Problem

The problem to be solved by the present invention is to solve the above-described problems and to provide an optical waveguide device that is small, has low optical loss, and has long-term stability. A further object of the present invention is to provide an optical modulation device and an optical transmission apparatus using the optical waveguide device.

Solution to Problem

In order to solve the above problems, an optical waveguide device, and an optical modulation device and an optical transmission apparatus that use the same according to the present invention have the following technical features.

(1) Provided is an optical waveguide device in which an optical waveguide A is formed on a first substrate, an end portion of the first substrate has an input portion that inputs a light wave into the optical waveguide A or an output portion that outputs a light wave from the optical waveguide A, an optical waveguide B is formed on a second substrate, the second substrate has an optical modulation portion that modulates a light wave propagating through the optical waveguide B, and at least apart of the optical waveguide A has a conversion portion that converts an optical mode field diameter.

(2) In the optical waveguide device according to (1), an optical mode field diameter of a light wave converted by the conversion portion is in a range of 2 µm or more and 5 µm or less.

(3) In the optical waveguide device according to (1) or (2), the second substrate has a thickness of 2 µm or less.

(4) In the optical waveguide device according to any one of (1) to (3), a connecting optical waveguide of the optical waveguide A, which connects the optical waveguide A and the optical waveguide B and is formed on the first substrate, is formed by using any one of ion implantation, ion exchange, or an ultrashort pulse laser.

(5) In the optical waveguide device according to any one of (1) to (4), a phase adjustment electrode is provided on either the first substrate or the second substrate.

(6) In the optical waveguide device according to any one of (1) to (5), a bent portion in which a traveling direction of a light wave rotates by 180 degrees may be formed in either the optical waveguide A or the optical waveguide B.

(7) The optical modulation device, in which the optical waveguide device according to any one of (1) to (6) is accommodated in a case, and the case is provided with an optical fiber for inputting a light wave to the optical waveguide or outputting a light wave from the optical waveguide.

(8) In the optical modulation device according to (7), the optical modulation portion of the optical waveguide device includes a modulation electrode, and an electronic circuit that amplifies a modulation signal to be input to the modulation electrode is provided inside the case.

(9) An optical transmission apparatus including: the optical modulation device according to (7) or (8); and an electronic circuit that outputs a modulation signal for causing the optical modulation device to perform a modulation operation.

Advantageous Effects of Invention

According to the present invention, provided is an optical waveguide device in which an optical waveguide A is formed on a first substrate, an end portion of the first substrate has an input portion that inputs a light wave into the optical waveguide A or an output portion that outputs a light wave from the optical waveguide A, an optical waveguide B is formed on a second substrate, the second substrate has an optical modulation portion that modulates a light wave propagating through the optical waveguide B, and at least a part of the optical waveguide A has a conversion portion that converts an optical mode field diameter, so that the conversion portion can be formed on the first substrate different from the second substrate while maintaining the excellent characteristics of the second substrate having the optical modulation portion, and which has a small size, low optical loss, and long-term stability.

DESCRIPTION OF EMBODIMENTS

Hereinafter, an optical waveguide device of the present invention will be described in detail with reference to suitable examples.

Figure 1:
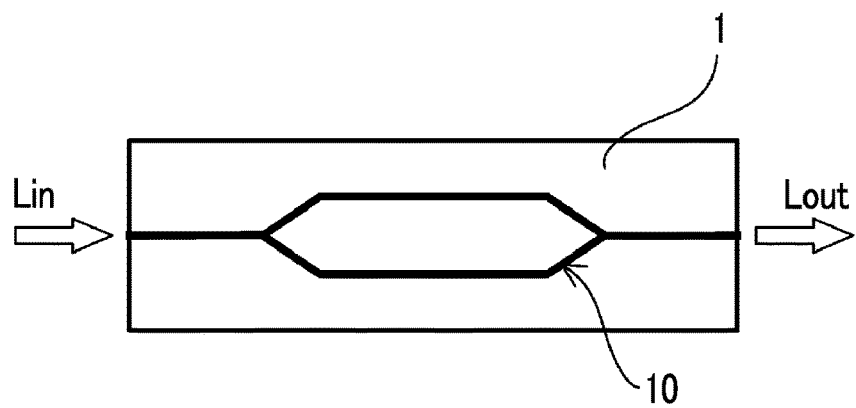
FIG. 1 is a plan view of an optical waveguide device.
Figure 2:
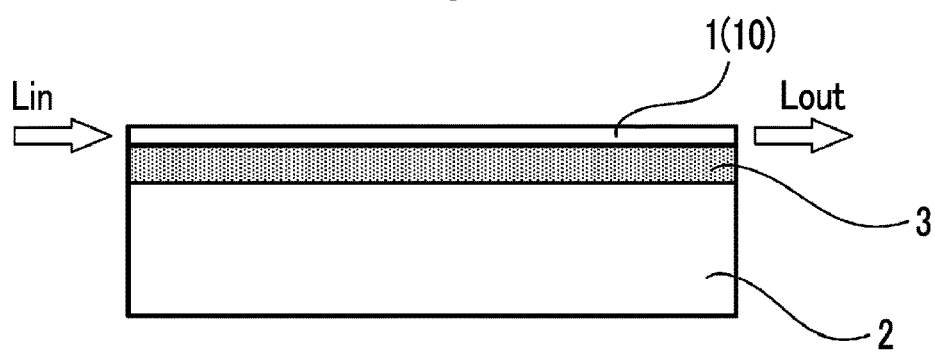
FIG. 2 is a side view of the optical waveguide device of FIG. 1 (cross-sectional view along an optical waveguide, same as below).
Figure 3:
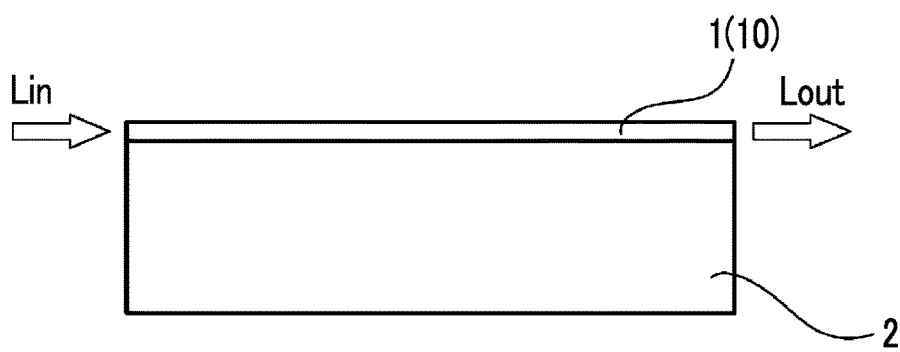
FIG. 3 is a side view of an optical waveguide device without an adhesive layer.
Figure 4:
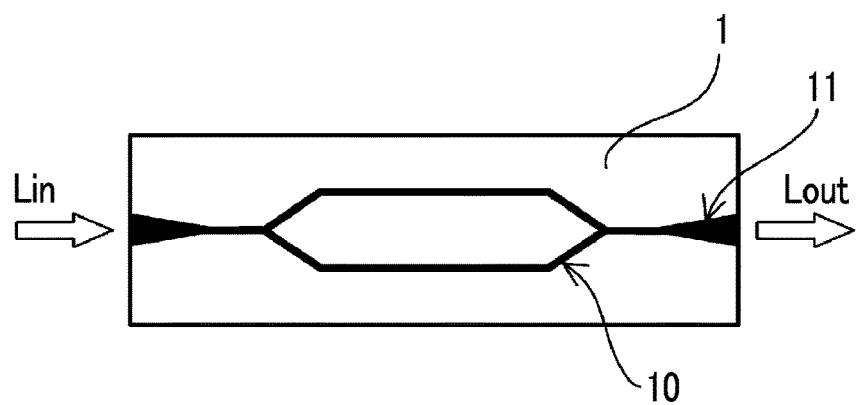
FIG. 4 is a plan view showing an example of an optical waveguide device using a semiconductor substrate.
Figure 5:
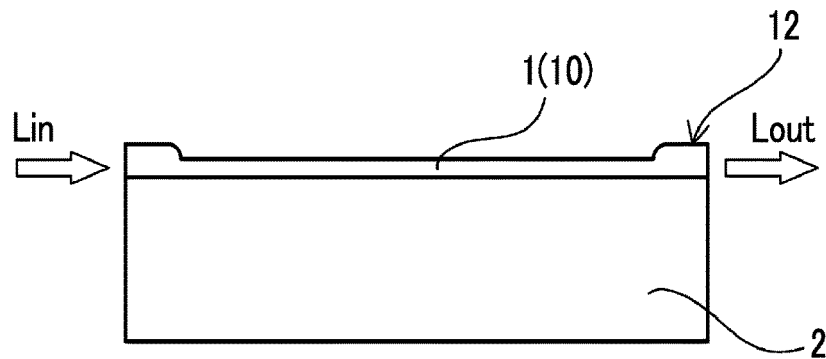
FIG. 5 is a side view showing another example of the optical waveguide device using the semiconductor substrate.
Figure 6:
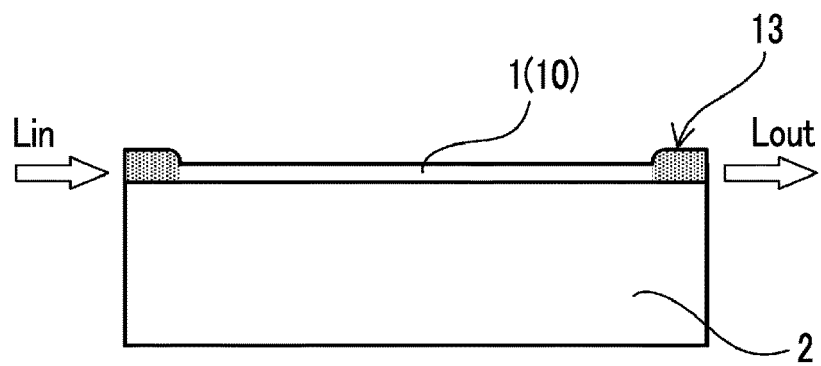
FIG. 6 is a side view showing an example of an optical waveguide device using an organic material at the end portion of the optical waveguide.
Figure 7:
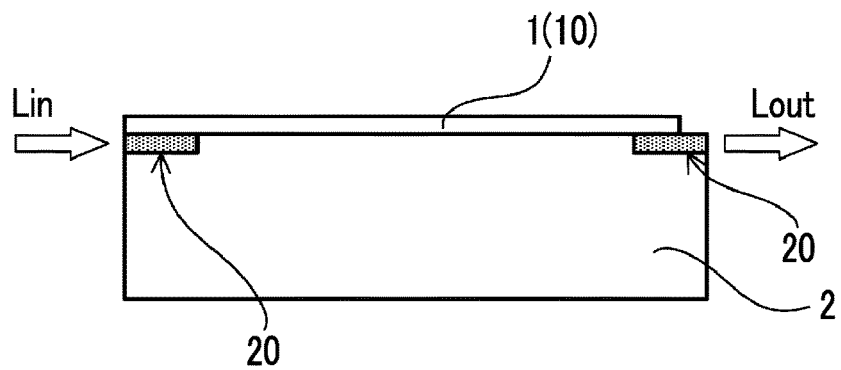
FIG. 7 is a side view showing a first embodiment of the optical waveguide device of the present invention.
Figure 8:
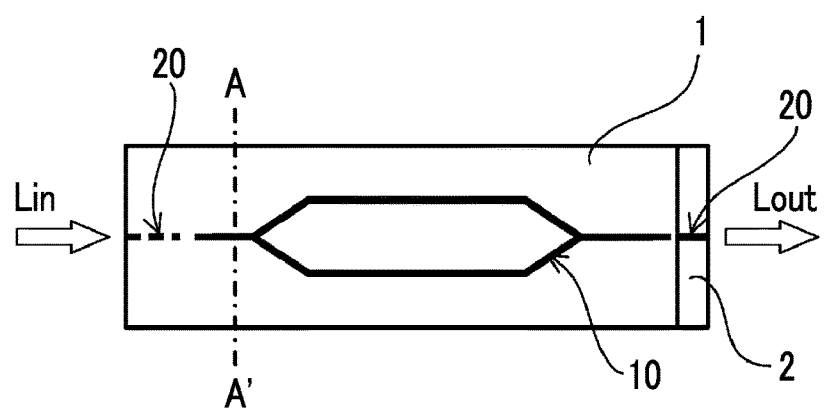
FIG. 8 is a plan view of the optical waveguide device of FIG. 7.

The optical waveguide device of the present invention, as shown in FIGS. 7 and 8, is an optical waveguide device in which an optical waveguide A (20) is formed on a first substrate (2), an end portion of the first substrate has an input portion that inputs a light wave into the optical waveguide A or an output portion that outputs a light wave from the optical waveguide A, an optical waveguide B (10) is formed on a second substrate (1), the second substrate has an optical modulation portion that modulates a light wave propagating through the optical waveguide B, and at least a part of the optical waveguide A (20) has a conversion portion (20) that converts an optical mode field diameter.

The material of the second substrate 1 used in the optical waveguide device of the present invention is composed of a material having an electro-optic effect, in particular, a substrate of lithium niobate (LN), lithium tantalate (LT), lead zirconate titanate lantern (PLZT), or the like, or vapor deposition films made of these materials can be used.

Further, various materials such as semiconductor materials and organic materials can also be used as optical waveguides.

As a method of forming an optical waveguide 10, by etching a substrate 1 other than the optical waveguide, or forming grooves on both sides of the optical waveguide, it is possible to use a rib-type optical waveguide having a convex portion corresponding to the optical waveguide on a substrate. Further, the refractive index of the optical waveguide can be further increased by diffusing Ti or the like on the surface of the substrate by a thermal diffusion method, a proton exchange method, or the like, along the rib-type optical waveguide.

The thickness of the second substrate (thin plate) on which the optical waveguide 10 is formed is set to 2 μm or less in order to achieve velocity matching between microwaves and light waves of the modulation signal. Further, the height of a rib-type optical waveguide is set to 1 μm or less, more preferably 0.4 μm or less. It is also possible to form a vapor deposition film on the first substrate 2, which is a holding substrate, and process the film into the shape of an optical waveguide.

A first substrate 2 serving as a holding substrate is directly bonded to a second substrate 1 on which an optical waveguide is formed without interposing a resin layer (adhesive layer) in order to increase mechanical strength. As the first substrate 2, a substrate containing a material having a refractive index lower than the refractive index of the second substrate and having a thermal expansion coefficient close to the thermal expansion coefficient of the optical waveguide, for example, an oxide layer such as crystal or glass (referred to as "glass material") is preferably used. A composite substrate in which a silicon oxide layer is formed on a silicon substrate abbreviated as SOI or LNOI or a silicon oxide layer is formed on an LN substrate can also be used.

As shown in FIGS. 7 and 8, the optical waveguide device of the present invention is characterized in that an embedded optical waveguide A (20) is formed at the end portion of a first substrate (for example, a glass substrate). A part or all of the optical waveguide A functions as a conversion portion that changes the optical mode field diameter of the propagating light wave. As an example, after directly bonding the second substrate (for example, an LN substrate) to the first substrate on which the optical waveguide A is formed, the second substrate is polished and thinned to a thickness of 2 μm or less, and a rib-type optical waveguide B (10) can be formed on the second substrate by a dry or wet etching method.

Figure 9:
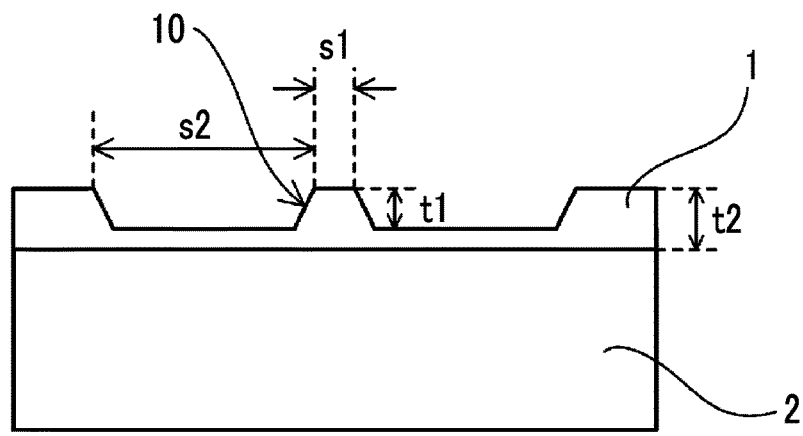
FIG. 9 is a cross-sectional view taken along a dashed-dotted line A-A' in FIG. 7.

FIG. 9 shows a cross-sectional view taken along a dashed-dotted line A-A' in FIG. 8. When forming the rib-type optical waveguide (10), the width s1 of the optical waveguide is set within the range of 0.2 to 2.0 μm, and the height t1 is set within the range of 0.2 to 2.0 μm. Further, the distance s2 between the optical waveguide and the adjacent raised portion of the substrate (substrate portion remaining without being etched) is set to 5.0 to 50.0 μm, and the thickness of the second substrate 1 is set to 0.5 to 2.0 μm.

By converting the optical mode field diameter in the optical waveguide A of the first substrate (glass substrate), it becomes possible to prevent an increase in optical loss due to a sudden change in the optical mode field diameter (10 μm) of the optical fiber and the optical mode field diameter (1 μm) of the LN substrate having the optical modulation portion. By making the output-side end portion of the rib-type optical waveguide (10) have a tapered structure, the mode transition to the optical waveguide formed on the first substrate becomes smooth.

Figure 10:
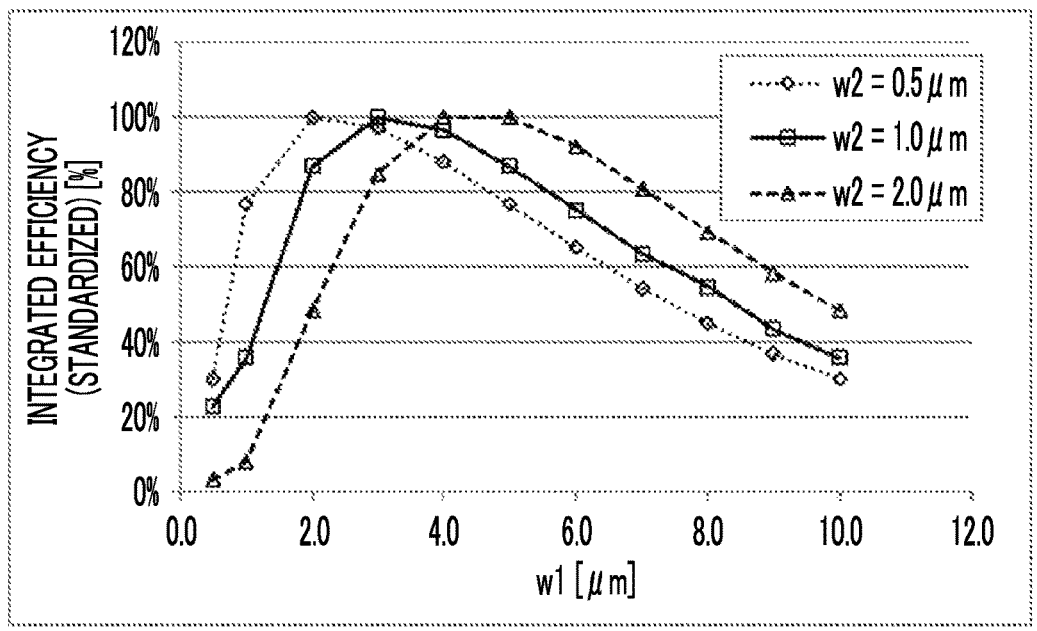
FIG. 10 is a diagram showing a change in coupling efficiency when changing a mode field diameter of a conversion portion.

FIG. 10 shows the efficiency of coupling to an optical fiber with an optical mode field diameter of 10 μm, through the optical mode field diameter w1 of the first substrate being 1.0 μm to 10.0 μm, when the optical mode field diameter w2 of the second substrate is 0.5 μm, 1.0 μm, and 2.0 μm. Here, the optical mode field diameter is the average of the vertical and horizontal optical mode field diameters, and is calculated simply from the difference between the optical mode field diameters. Further, each graph is standardized based on the peak value.

In the optical waveguide A (20) of the first substrate (glass substrate), particularly, the conversion portion, by setting the optical mode field diameter w1 to include a region of 2 μm or more and 5 μm or less, it is possible to prevent a significant decrease in coupling efficiency, leading to a reduction in optical loss. Further, since a sharp change in the optical mode field diameter leads to an increase in optical loss, it is expected that by gradually changing w1 of the optical waveguide A and w2 of the optical waveguide B, the optical loss can be further reduced.

From the viewpoint of optical coupling efficiency, it is desirable that w1 of the optical waveguide A (20) is larger than w2 of the optical waveguide B (10), and the optical waveguide A and the optical waveguide B overlap with each other at least when the first substrate is viewed in plan.

However, when the evanescent wave of each optical waveguide is used, the optical waveguide A and the optical waveguide B may not overlap in the range of optical coupling with each other. Further, it is desirable that the refractive index n1 of the optical waveguide A (20) is smaller than the refractive index n2 of the optical waveguide B (10).

Ion exchange, ion implantation, and ultrashort pulse laser irradiation are examples of methods for forming the embedded optical waveguide A in the first substrate (glass substrate). For example, in the case of ion exchange, when a mask pattern is formed with a metal film such as titanium on a glass substrate such as soda glass and immersed in a potassium nitrate melt at 300 to 400° C., only the opening parts of the metal film are selectively ion-exchanged to form an optical waveguide. The refractive index can be increased by about 0.01 to 0.1 depending on conditions such as immersion temperature, time and applied voltage. K, Ag, Tl, or the like can be used for ion exchange. Such a structure can increase the refractive index difference as compared with an optical waveguide in which titanium is thermally diffused in lithium niobate. It is also possible to make the optical mode field diameter of the glass substrate smaller than the optical mode field diameter (10 μm) of the optical fiber. Therefore, it is possible to set the optical mode field diameter of the substrate to a region of 2 μm or more and 5 μm or less as described above, thereby preventing a significant decrease in the coupling efficiency with the optical fiber.

After the ion exchange, if the metal mask is removed by wet etching, an optical waveguide can be formed on one surface of the first substrate. The surface of the glass substrate is polished, then directly bonded to the LN substrate, and then the LN substrate is polished to 2 μm or less. After forming a rib-type waveguide on the LN substrate by dry etching, gold electrodes are formed by plating.

In the case of ion implantation, ions such as Si, Ge, or P are implanted into the glass substrate and heat treated at 300 to 900° C. to form an optical waveguide. Depending on conditions such as the type of implanted ions, dose amount, and heat treatment, it is possible to increase the refractive index of the ion-implanted portion by about 0.05. In the case of ion implantation, similarly to ion exchange, it is necessary to form an embedded optical waveguide in the first substrate (glass substrate) before being directly bonded to the LN substrate.

In the case of an ultrashort pulse laser, focused irradiation of a femtosecond laser induces a structural change inside the glass, thereby changing the refractive index and forming an optical waveguide. Depending on conditions such as pulse width, repetition frequency, and pulse energy, it is possible to increase the refractive index near the focal point of the laser beam by about 0.01. 6-membered rings or 5-membered rings are dominant in the network of silicon and oxygen that constitute ordinary silica glass, but in the network of sites irradiated with an ultrashort pulse laser, the number of membered rings decreases and the number of 3- and 4-membered rings increases. In other words, the content ratio of the 3- or 4-membered rings composed of silicon and oxygen in the silica glass in the optical waveguide formed by focused irradiation of the femtosecond laser becomes larger than the content ratio in other parts of the substrate on which the optical waveguide is formed. An optical waveguide with an increased number of 3-membered rings and 4-membered rings has an improved density and an increased mechanical strength, compared to other portions where there is no change in the number of membered rings.

When an optical waveguide is formed with an ultrashort pulse laser, the optical waveguide is confined to the focal point of the laser beam, so that it is also possible to three-dimensionally connect the optical waveguide of the LN substrate having the optical modulation portion and the optical waveguide formed on the glass substrate, and it is possible to provide an optical waveguide device with lower loss.

Figure 11:
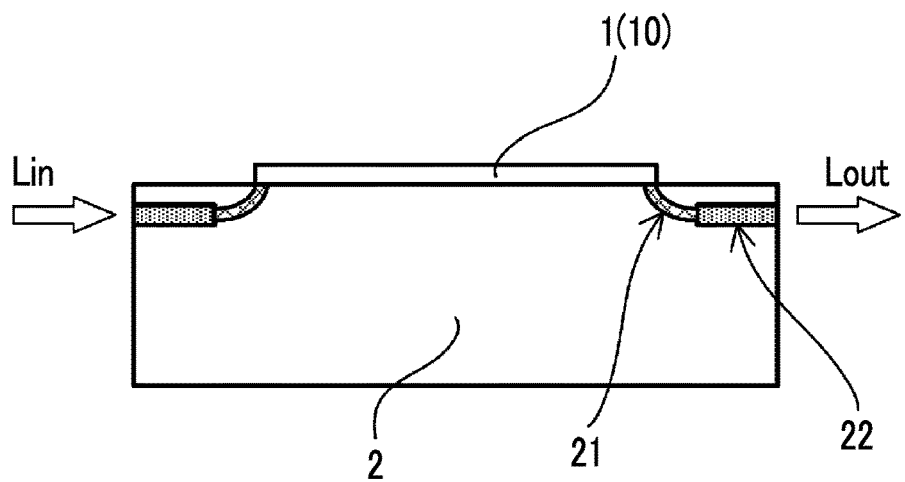
FIG. 11 is a side view showing a second embodiment of the optical waveguide device of the present invention.

FIG. 11 is a diagram showing another embodiment of the optical waveguide device of the present invention. As shown in FIG. 11, a connecting optical waveguide (21) that three-dimensionally connects an optical waveguide (22) formed on a first substrate (glass substrate) (2) and an optical waveguide (10) formed on a second substrate (LN substrate) (1) is provided. The conversion portion that changes the optical mode field diameter may be either the connecting optical waveguide (21) or the optical waveguide (22). Further, if necessary, it is possible to separately forma conversion portion at the end portion of the optical waveguide (22) opposite to the connecting optical waveguide (21). The optical waveguide (22) and the connecting optical waveguide (21) can also be formed by an ultrashort pulse laser, ion exchange, or ion implantation as described above. In particular, when the connecting optical waveguide (21) is three-dimensionally formed in the thickness direction of the first substrate (glass substrate) (2) as shown in FIG. 11, from the viewpoint of low optical loss and mechanical strength, at least the connecting optical waveguide (21) may be formed by an ultrashort pulse laser, and the number of 3-membered rings and 4-membered rings may be increased. Further, the refractive index of the connecting optical waveguide (21) may be formed so as to gradually increase from the optical waveguide (10) side to the optical waveguide (22) side.

Figure 12:
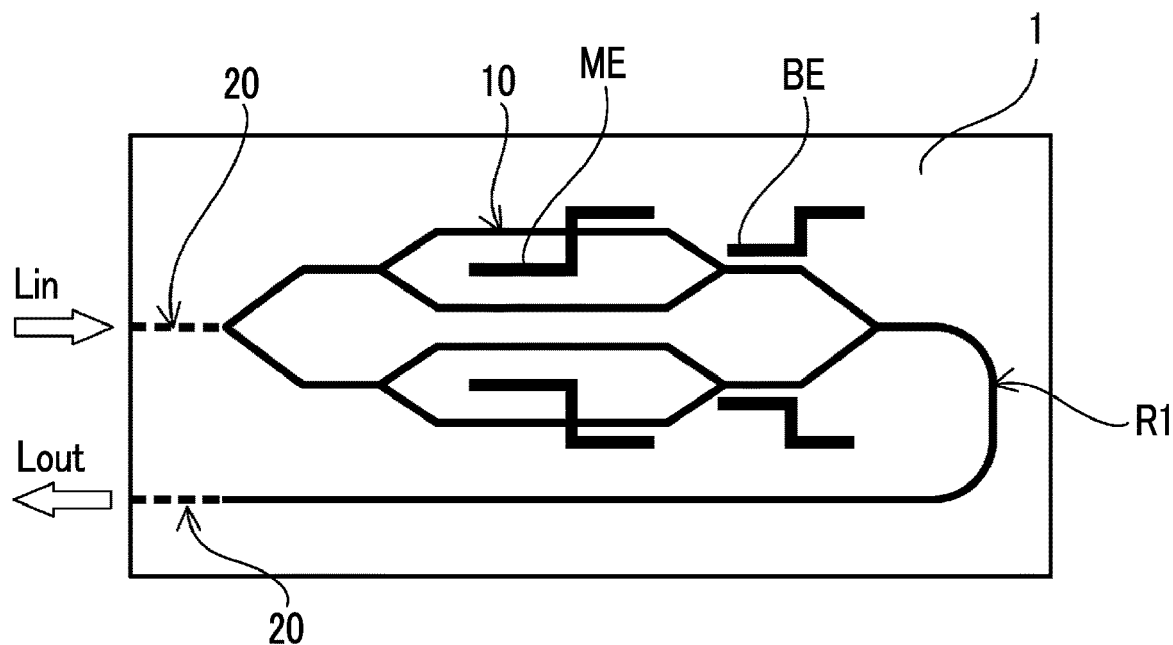
FIG. 12 is a plan view showing a third embodiment of the optical waveguide device of the present invention.
Figure 13:
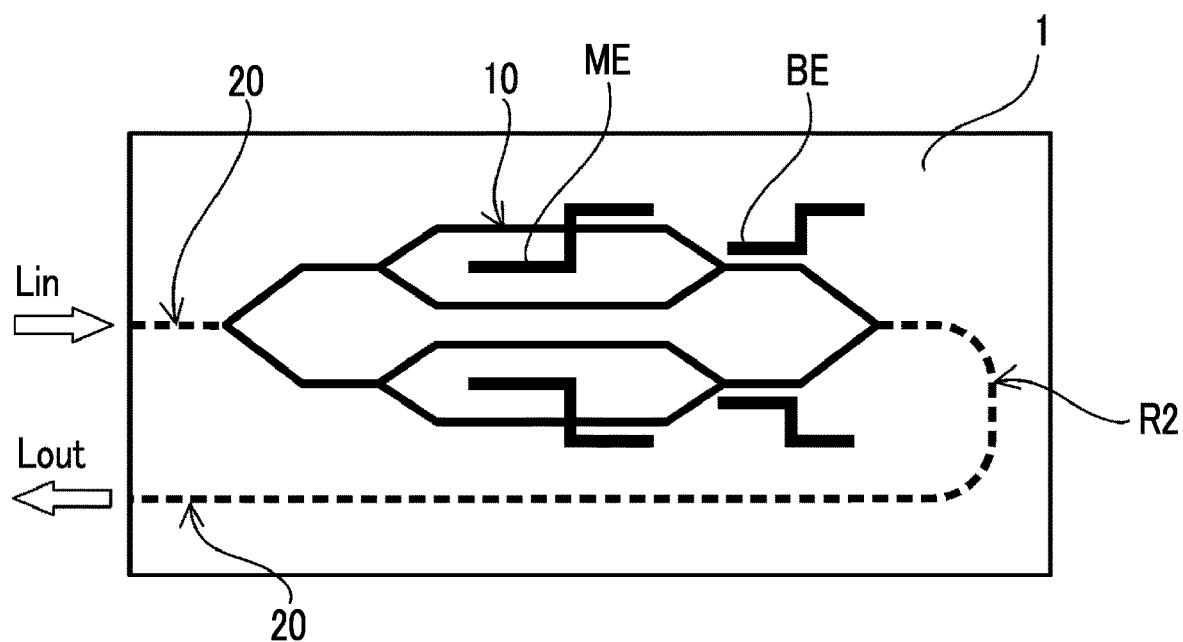
FIG. 13 is a plan view showing a fourth embodiment of the optical waveguide device of the present invention.
Figure 14:
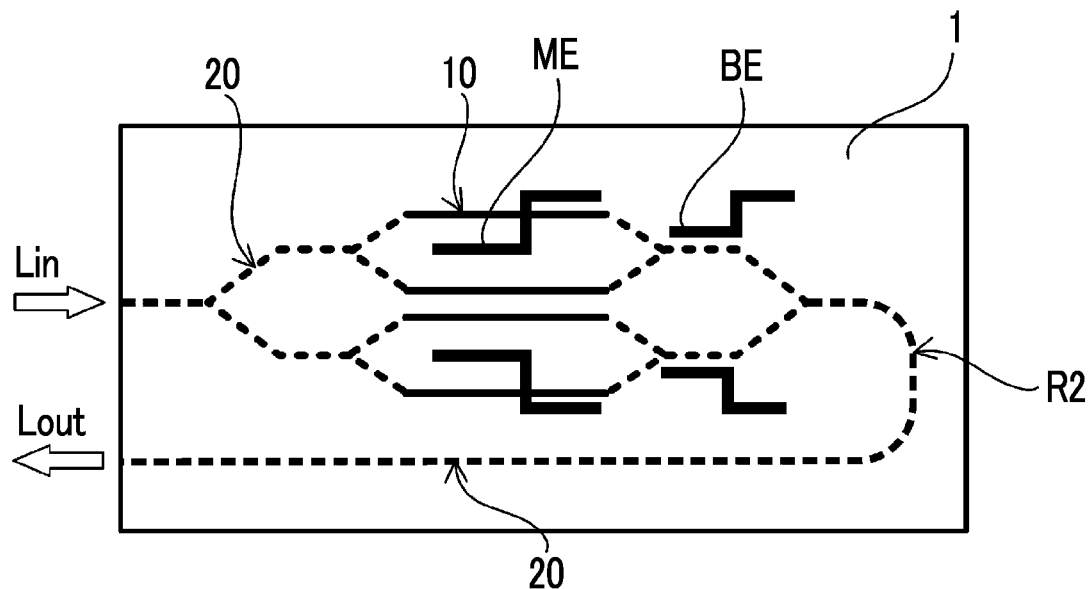
FIG. 14 is a plan view showing a fifth embodiment of the optical waveguide device of the present invention.

By combining these techniques, it is possible to configure various optical waveguide devices as shown in FIGS. 12 to 14. FIG. 12 shows a structure for reducing optical loss only at the light input/output portion (the part of the optical waveguide (20)). FIG. 13 shows a structure in which light input/output portions, a 180° bent portion (R2), and a linear portion connecting the bent portion to the output portion are formed on the first substrate to reduce optical loss. FIG. 14 shows a structure in which, except for the optical modulation portion, light input/output portions, a 180° bent portion, a linear portion, and even a Mach-Zehnder branch portion are formed on the first substrate to reduce optical loss.

Reference symbol ME shown in FIGS. 12 to 14 is a traveling wave modulation electrode, and reference symbol BE is a phase adjusting bias electrode. When the phase adjustment electrode BE is provided on the second substrate (LN substrate), it is composed of a DC bias electrode. As shown in FIG. 14, when the electrode BE is provided on the first substrate (glass substrate), it becomes a heating electrode using the thermo-optical effect. Note that the input portion (Lin) and the output portion (Lout) in FIGS. 12 to 14 may be interchanged. In this case, the positions of the modulation electrode and the bias electrode are appropriately changed. However, when the transmission distance of the optical waveguide on the input side is long, it is desirable that the polarization state of the light is maintained.

Figure 15:
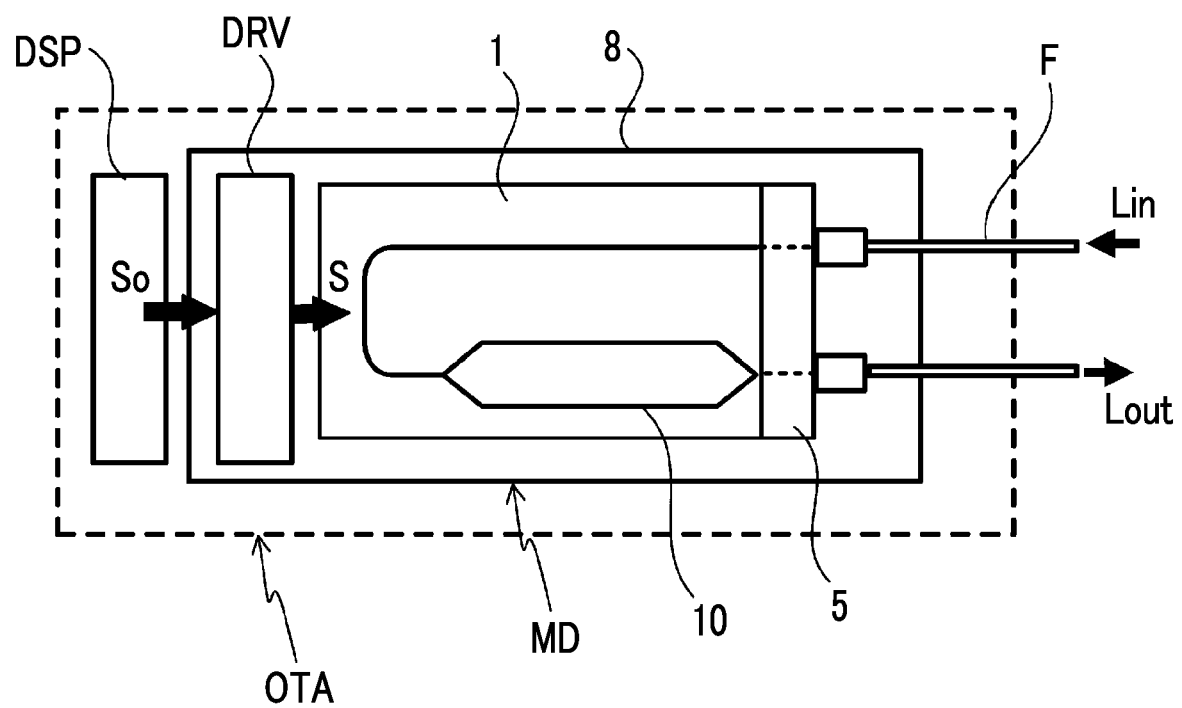
FIG. 15 is a plan view illustrating an optical modulation device and an optical transmission apparatus according to the present invention.

The optical waveguide device of the present invention is provided with modulation electrodes for modulating the light wave propagating through the optical waveguide 10, and is accommodated in the case 8 as shown in FIG. 15. Furthermore, by providing an optical fiber (F) for inputting and outputting light waves from and to the optical waveguide, the optical modulation device MD can be configured. In FIG. 15, the optical fiber is introduced into the case via a through-hole passing through the side wall of the case and directly bonded to the optical waveguide device. The optical waveguide device and the optical fiber can also be optically connected via a space optical system. Reference numeral 5 denotes a reinforcing member used to protect the vicinity of the end face of the optical waveguide device and to ensure the bonding between the optical waveguide device and the optical fiber or optical block.

An optical transmission apparatus OTA can be configured by connecting an electronic circuit (digital signal processor DSP) that output a modulation signal for causing the optical modulation device MD to perform a modulation operation, to the optical modulation device MD. A driver circuit DRV is used because the modulation signal to be applied to the optical waveguide device needs to be amplified. The driver circuit DRV and the digital signal processor DSP can be disposed outside the case 8, and can also be disposed inside the case 8. In particular, by disposing the driver circuit DRV inside the case, it is possible to further reduce the propagation loss of the modulation signal from the driver circuit.

INDUSTRIAL APPLICABILITY

As described above, according to the present invention, it is possible to provide an optical waveguide device that is small, has low optical loss, and has long-term stability. A further object of the present invention is to provide an optical modulation device and an optical transmission apparatus using the optical waveguide device.

REFERENCE SIGNS LIST 1 second substrate
2 first substrate
10 optical waveguide B
20 optical waveguide A (a part or all of the optical waveguide A includes a conversion portion of an optical mode field diameter)

The invention claimed is:

1. An optical waveguide device wherein
an optical waveguide A is formed on a first substrate,
an end portion of the first substrate has an input portion that inputs a light wave into the optical waveguide A or an output portion that outputs a light wave from the optical waveguide A,
an optical waveguide B is formed on a second substrate,
the second substrate has an optical modulation portion that modulates a light wave propagating through the optical waveguide B,
the first substrate is bonded to the second substrate,
the optical waveguide A and the optical waveguide B are optically coupled, and
at least a part of the optical waveguide A has a conversion portion that converts an optical mode field diameter.

2. The optical waveguide device according to claim 1, wherein
an optical mode field diameter of a light wave converted by the conversion portion is in a range of 2 μm or more and 5 μm or less.

3. The optical waveguide device according to claim 1, wherein the second substrate has a thickness of 2 μm or less.

4. The optical waveguide device according to claim 1, wherein a connecting optical waveguide of the optical waveguide A, which connects the optical waveguide A and the optical waveguide B and is formed on the first substrate, is formed by using any one of ion implantation, ion exchange, or an ultrashort pulse laser.

5. The optical waveguide device according to claim 1, wherein a phase adjustment electrode is provided on either the first substrate or the second substrate.

6. The optical waveguide device according to claim 1, wherein a bent portion in which a traveling direction of a light wave rotates by 180 degrees is formed in either the optical waveguide A or the optical waveguide B.

7. An optical modulation device, wherein the optical waveguide device according to claim 1 is accommodated in a case, and the case is provided with an optical fiber for inputting a light wave to the optical waveguide or outputting a light wave from the optical waveguide.

8. The optical modulation device according to claim 7, wherein
   the optical modulation portion of the optical waveguide device includes a modulation electrode, and an electronic circuit that amplifies a modulation signal to be input to the modulation electrode is provided inside the case.

9. An optical transmission apparatus comprising:
   the optical modulation device according to claim 7; and an electronic circuit that outputs a modulation signal for causing the optical modulation device to perform a modulation operation.

10. The optical waveguide device according to claim 1, wherein
    the optical waveguide A and the optical waveguide B overlap with each other when the first substrate is viewed in plan.

* * * * *